(12) United States Patent
Guha et al.

(10) Patent No.: US 10,613,912 B2
(45) Date of Patent: Apr. 7, 2020

(54) DATASET INGESTION ARCHITECTURE FOR PARALLEL PROCESSING CLUSTERS

(71) Applicant: Accenture Global Solutions Limited, Dublin (IE)

(72) Inventors: Sandip Guha, Kolkata (IN); Ajay Kumar Sharma, Pune (IN); Shridhar D. Rajgopalan, Bangalore (IN); Sunjeet Gupta, Pune (IN); Sanjid Lalitkumar Deshmukh, Mumbai (IN); Vinay Aditya Mantha, Hyderabad (IN); Manish Madanmohan Malaviya, Thane (IN); Rahul Sohanlal Mantri, Pune (IN); Amesh Jayendra Karekar, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 137 days.

(21) Appl. No.: 15/983,833

(22) Filed: May 18, 2018

(65) Prior Publication Data
US 2018/0336072 A1 Nov. 22, 2018

(30) Foreign Application Priority Data
May 22, 2017 (IN) .............................. 201741017866

(51) Int. Cl.
*G06F 9/52* (2006.01)
*G06F 16/11* (2019.01)

(52) U.S. Cl.
CPC .............. *G06F 9/52* (2013.01); *G06F 16/116* (2019.01)

(58) Field of Classification Search
CPC ......... G06F 9/52; G06F 16/116; G06F 16/182
USPC ......................................... 717/100–125, 143
See application file for complete search history.

(56) References Cited

U.S. PATENT DOCUMENTS

| | | | |
|---|---|---|---|
| 8,819,106 B1 * | 8/2014 | Sirota ..................... | G06F 9/485 709/201 |
| 9,998,551 B1 * | 6/2018 | Campbell ............... | H04L 67/16 |
| 10,209,963 B2 * | 2/2019 | Hutchison ............... | G06F 8/451 |
| 10,409,560 B1 * | 9/2019 | Bebee .................... | G06F 8/4441 |
| 2010/0205588 A1 * | 8/2010 | Yu ............................. | G06F 9/52 717/149 |
| 2016/0291942 A1 * | 10/2016 | Hutchison ............... | G06F 8/451 |
| 2018/0089324 A1 * | 3/2018 | Pal ......................... | G06F 9/5011 |
| 2018/0253478 A1 * | 9/2018 | Schoueri ............... | G06F 3/0643 |
| 2018/0336072 A1 * | 11/2018 | Guha .................... | G06F 16/116 |
| 2018/0349614 A1 * | 12/2018 | Ionescu ................. | G06F 21/577 |
| 2019/0095491 A1 * | 3/2019 | Bhattacharjee ... | G06F 16/24553 |
| 2019/0095494 A1 * | 3/2019 | Bhattacharjee ..... | G06F 11/3433 |
| 2019/0138639 A1 * | 5/2019 | Pal ...................... | G06F 17/2705 |

\* cited by examiner

*Primary Examiner* — Marina Lee
(74) *Attorney, Agent, or Firm* — Brinks Gilson & Lione

(57) ABSTRACT

An ingestion code generation architecture facilities making large and complex datasets available for processing by parallel processing clusters. The architecture generates a set of data ingestion interfaces through which the operator specifies characteristics of their dataset. After receiving the specifications, the architecture automatically samples the dataset, analyzes its structure, and generates program code to ingest the dataset. The architecture solves the technical challenges of making complex and extensive datasets readily available to the parallel processing cluster so that the cluster may successfully perform its specialized processing over the dataset.

20 Claims, 10 Drawing Sheets

DATASET INGESTION ARCHITECTURE FOR PARALLEL PROCESSING CLUSTERS

CROSS REFERENCE TO RELATED APPLICATIONS

This application claims priority to Indian Patent Application No. 201741017866, entitled "DATASET INGESTION ARCHITECTURE FOR PARALLEL PROCESSING CLUSTERS", filed on May 22, 2017, the entirety of which is hereby incorporated by reference.

TECHNICAL FIELD

This application relates to parallel processing clusters. This application also relates to automatic generation of program code in a language selected from multiple options that ingests large and complex datasets so that the parallel processing cluster can operate on the data.

BACKGROUND

Parallel processing clusters of individual computing devices provide a framework for high-speed distributed processing of immense datasets. However, the amount of data in many datasets can easily reach and exceed multiple terabytes (TBs) and the dataset may have significant complexity in terms of file type, delimiters, data field length and so on. The size and complexity of datasets presents a significant technical challenge to executing important processing tasks on a parallel processing cluster. Improvements in making large, complex datasets readily available to the many devices in the cluster will enhance the ability of parallel processing clusters to execute complex processing tasks.

DETAILED DESCRIPTION

Figure 1:
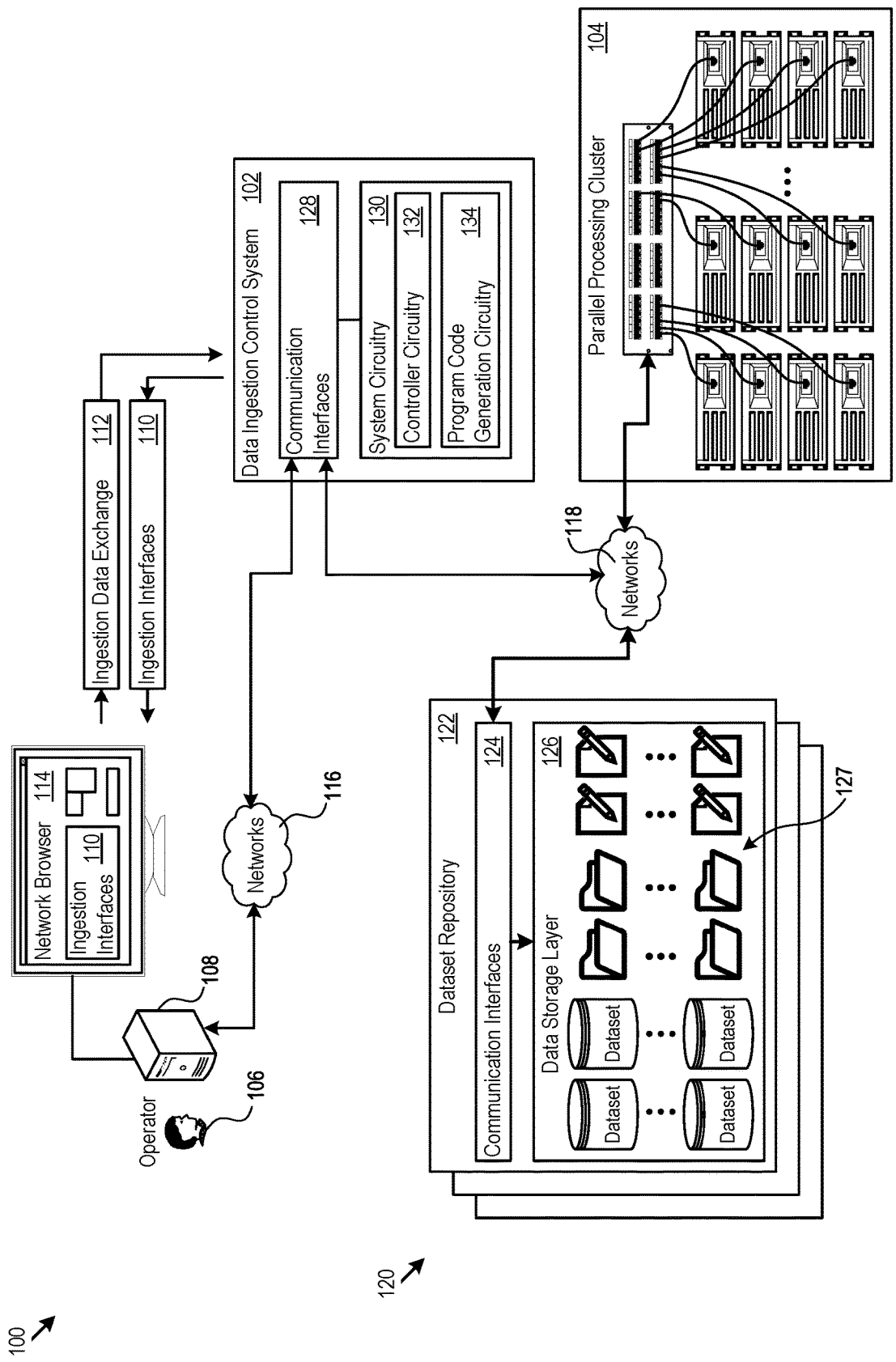
FIG. 1 shows an example of a data ingestion architecture including a data ingestion control system for a parallel processing cluster.
Figure 2:
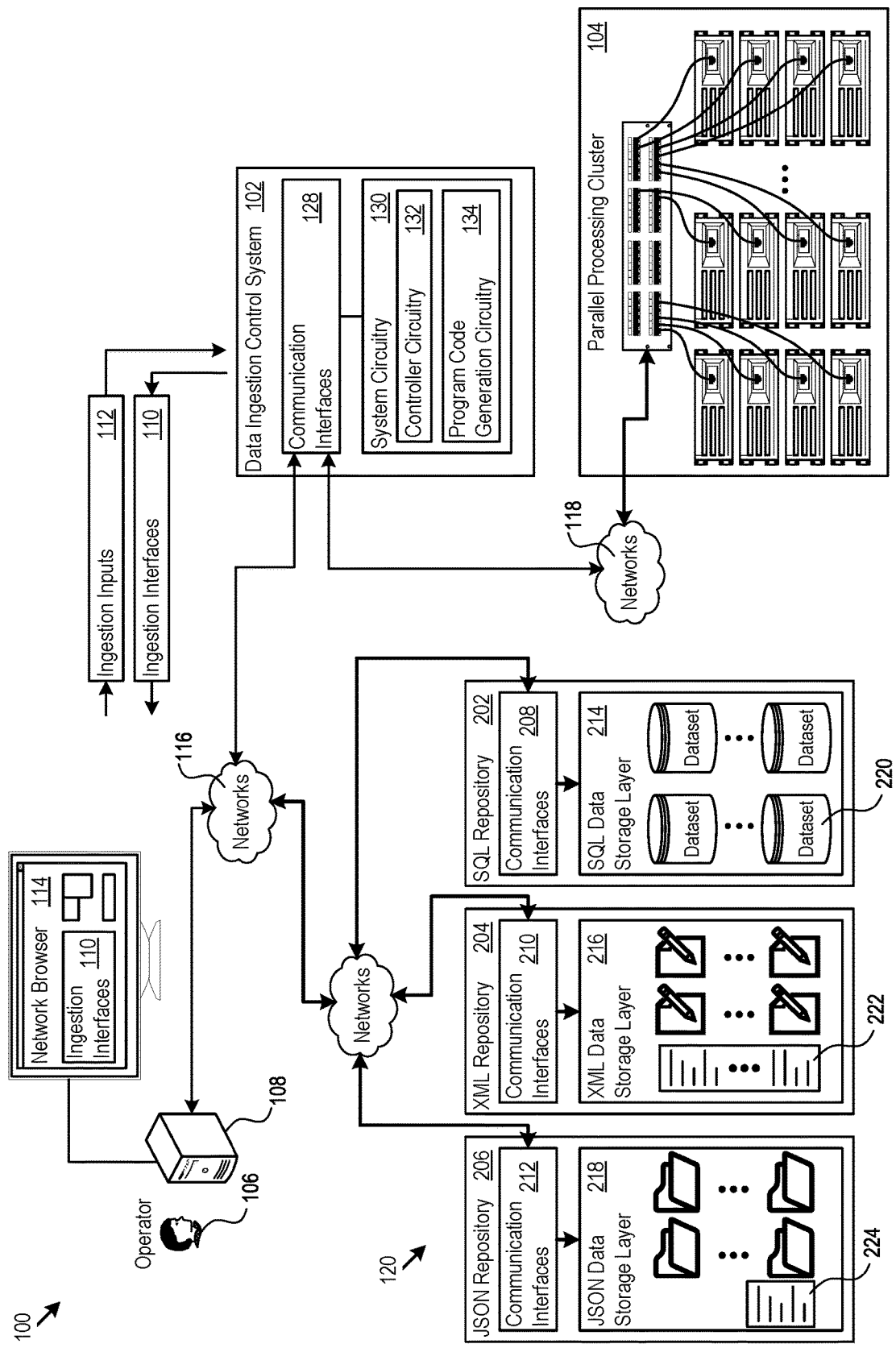
FIG. 2 shows another example of a data ingestion architecture including a data ingestion control system for a parallel processing cluster.

FIGS. 1 and 2 provide an example context for the discussion below of the technical solutions in the data ingestion architecture. The examples in FIGS. 1 and 2 show possible implementation environments. In that respect, the technical solutions in the architecture are not limited in their application or implementation to the contexts shown in FIGS. 1 and 2, and the implementations are not limited to those shown in any of the Figures. Instead, the technical solutions may be applied in many other system implementations, contexts, environments, and architectures.

FIG. 1 shows an example data ingestion architecture 100 in which a data ingestion control system 102 ("system" 102) facilitates data ingestion of large and complex datasets that the parallel processing cluster 104 will process. An operator 106 interacts with the system 102 through a local or remote system 108 in communication with the system 102. In that respect, the system 102 may generate and communicate data ingestion interfaces 110 to the other system 108, and perform ingestion data exchange 112 with the other system 108. The ingestion data exchanges 112 may include operator input for the system 102 through the ingestion interfaces 110, and system output to the operator concerning the data ingestion process, described in detail below.

In one implementation, the system 102 connects to the operator over an exposed network protocol layer. Such a layer may include a network browser 114 based web interface using an Apache Tomcat™ webserver and hypertext markup language (HTML), Java, and JavaServer Pages (JSP), JavaQuery (JQuery), as examples. The system 102 communicates with other entities over any number and type of public or private networks, e.g., the networks 116 and 118. Examples of suitable networks include the Internet, public or private local area networks (LANs) and wide area networks (WANs) whether wired or wireless.

As described in detail below, the system 102 will automatically generate parallel processing cluster ingestion code for deployment in the parallel processing cluster 104. In some implementations, the system 102 may generate a data schema upon reading an input data file as well, and provide the schema to the operator for review and to the parallel processing cluster 104 to facilitate operating on the ingested data. If the operator 106 chooses to deploy the code to the parallel processing cluster 104, then the parallel processing cluster 104 may execute the code to ingest project dataset files meeting the file format and parameterization inputs given by the operator 106.

The dataset files may exist in dataset repositories 120, e.g., the dataset repository 122. In the example in FIG. 1, the dataset repository 122 includes communication interfaces 124 and a data storage layer 126. The data storage layer 126 may be, as examples, a database system or a file system for any OS (e.g., NTFS for Windows™ OS). The data storage layer 126 stores the datasets 127 to be ingested to the parallel processing cluster 104. The datasets 127 may be of any type and in any number and size, e.g., SQL database files, flat files, XML files, JSON files, CSV files, and text files, and these files may have varying structures, including a wide variety of formats, tags, record lengths, field delimiters, and fixed or variable field widths. In many real-world scenarios, the datasets 127 span multiple TB of data across many different file formats, and these complexities give rise to the technical challenge of efficiently ingesting the complex datasets to the parallel processing cluster 104.

The system 102 also includes communication interfaces 128 and system circuitry 130. The communication interfaces 128 and 124 connect to the networks 116 and 118. Examples of communication interfaces and network implementations are given below in connection with FIG. 3. In one implementation, the system circuitry 130 includes controller circuitry 132 and program code generation circuitry 134. As will be described in detail below, the controller circuitry 132 handles operator interactions via the ingestion interfaces 110 and directs the operation of the program code generation circuitry 134. The program code generation circuitry 134 produces ingestion code for complex datasets responsive to the operator interactions.

FIG. 2 shows another example data ingestion architecture 200. In this example, the dataset repositories 120 include the SQL repository 202, the XML repository 204, and the JSON repository 206. The communication interfaces 208, 210, and 212 connect the repositories 202-206 to the system 102. Each repository includes a data storage layer, e.g., the SQL data storage layer 214, the XML data storage layer 216, and the JSON data storage layer 218. The repositories 202-206 may represent physical data storage facilities, for instance, and the data storage layers 214-218 may represent offloaded files from databases, file systems, or other data storage mechanisms. Note however, that any given repository need not be dedicated to a single type of file or data structure, but may store any type and number of file.

FIG. 2 illustrates dataset sample sources as well, including the SQL sample database 220, the XML sample file 222, and the JSON sample fie 224. The dataset sample sources may provide, for instance, representative sources of data of selected types for analysis by the program code generation circuitry 134. The program code generation circuitry 134 may sample any of the datasets, including the dataset sample sources, in the course of its analysis to determine and verify file structure against the inputs received in the ingestion data exchanges 112, and in the course of automatically generating ingestion code that correctly recognizes and accepts data organized according a specific file structure.

Figure 3:
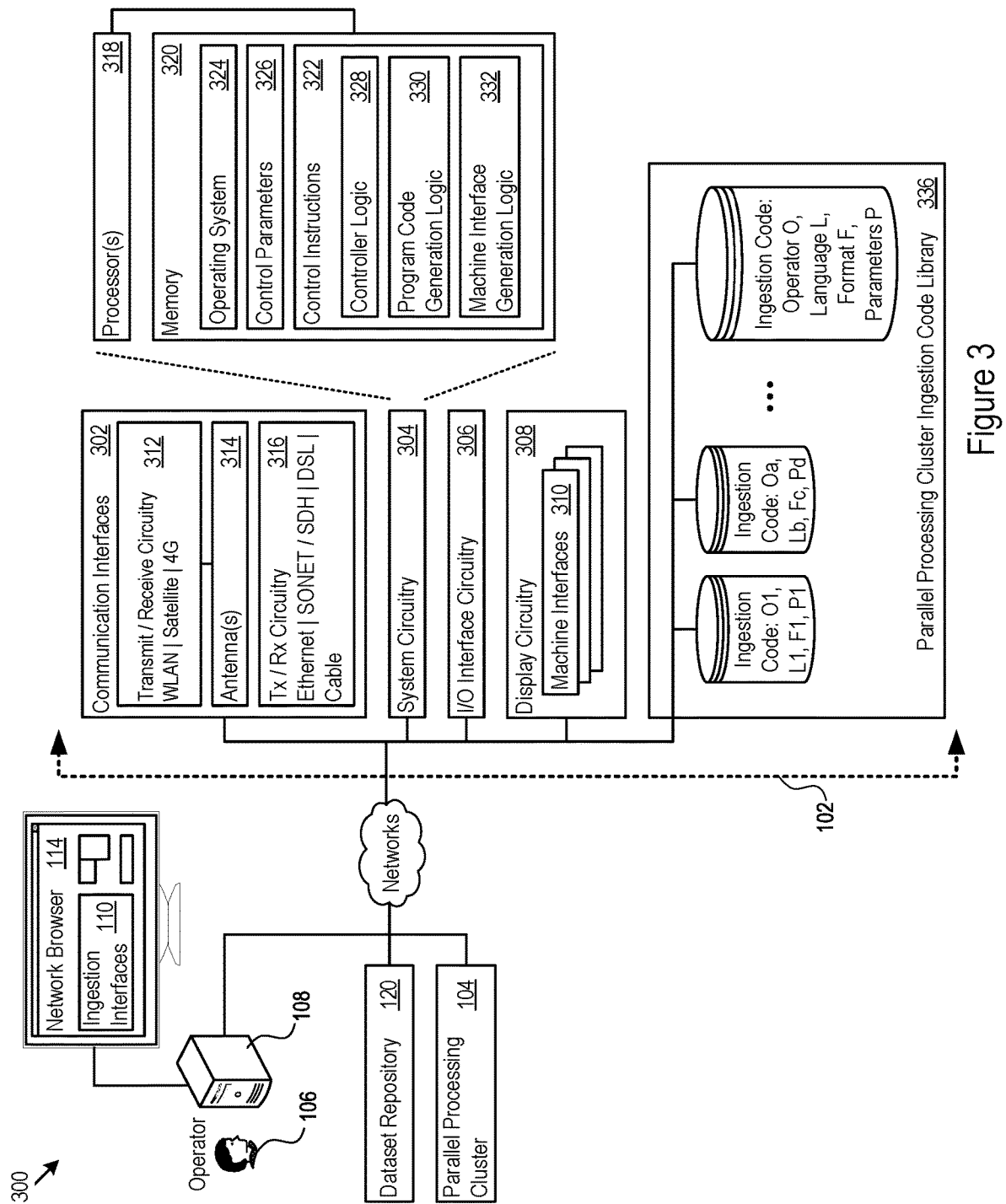
FIG. 3 shows an example system implementation for the data ingestion control system.

FIG. 3 shows an example system implementation 300 for the data ingestion control system 102. The example implementation 300 includes communication interfaces 302, system circuitry 304, and input/output (I/O) interface circuitry 306. The data ingestion control system 102 includes display circuitry 308 that generates machine interfaces 310 locally or for remote display, e.g., in a web browser running on a local or remote machine. The ingestion interfaces 110 described below are examples of machine interfaces 310. The machine interfaces 310 and the I/O interfaces 306 may include GUIs, touch sensitive displays, voice or facial recognition inputs, keys, switches, speakers and other user interface elements.

The communication interfaces 302 may include wireless transmitters and receivers ("transceivers") 312 and any antennas 314 used by the transmit and receive circuitry in the transceivers 312. The transceivers 312 and antennas 314 may support WiFi network communications, for instance, under any version of IEEE 802.11, e.g., 802.11b, g, n, or ac. The communication interfaces 302 may also include physical transceivers 316. The physical transceivers 316 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 304 may include hardware, software, firmware, or other circuitry in any combination. The system circuitry 304 may be implemented, for example, with one or more systems on a chip (SoC), application specific integrated circuits (ASIC), microprocessors, discrete analog and digital circuits, and other circuitry. The system circuitry 304 is part of the implementation of any desired functionality in the data ingestion control system 102, including the controller circuitry 132 and the program code generation circuitry 134. As just one example, the system circuitry 304 may include one or more instruction processors 318 and memories 320. The memory 320 stores, for example, control instructions 322 executed by an operating system 324. In one implementation, the processor 318 executes the control instructions 322 and the operating system 324 to carry out any desired functionality for the data ingestion control system 102. The control parameters 326 specify configuration and operating options for the control instructions 322, operating system 324, and other functionality of the data ingestion control system 102.

In this example, the control instructions 322 include controller logic 328, program code generation logic 330, and machine interface generation logic 332. The controller logic 328 guides the operation of the data ingestion control system 102, including, as examples: generating data file format selectors, generating format-specific parameterization interfaces, accepting output language selections, identifying paired dataset processors, and initiating execution of the paired dataset processor in the program code generation circuitry. The program code generation logic 330 accepts parameterization inputs from the controller logic 328 and directives to execute a particular paired dataset processor. The program code generation logic 330 may sample the format and structure of a specific input file to test it against the parameterization inputs, and responsive to the parameterization inputs generates parallel processing cluster ingestion code 334. The parallel processing cluster ingestion code 334 is written in the selected output language (e.g., Java or Scala) and is configured for deployment in the parallel processing cluster 104 to ingest project dataset files meeting the file format and parameterization inputs. The ingestion code 334 may be retained in a parallel processing cluster ingestion code library 336, along with any other previously generated ingestion code for any operator, for any output language, file format, and parameterization inputs. The parallel processing cluster ingestion code library 336 provides a data storage platform for review, modification, and deployment of ingestion code under, e.g., operator control.

The machine interface generation logic 332 generates and delivers a linked interactive set of GUIs (e.g., the ingestion interfaces 110) that facilitate interaction with the data ingestion control system 102. The linked interactive set of GUIs, e.g., accept format selector inputs representing a file format, accept parameterization inputs for the file format, accept language selections between various cluster programming languages, generate post-ingestion data preview, and display and accept confirmation inputs from the post-ingestion data previews.

Figure 4:
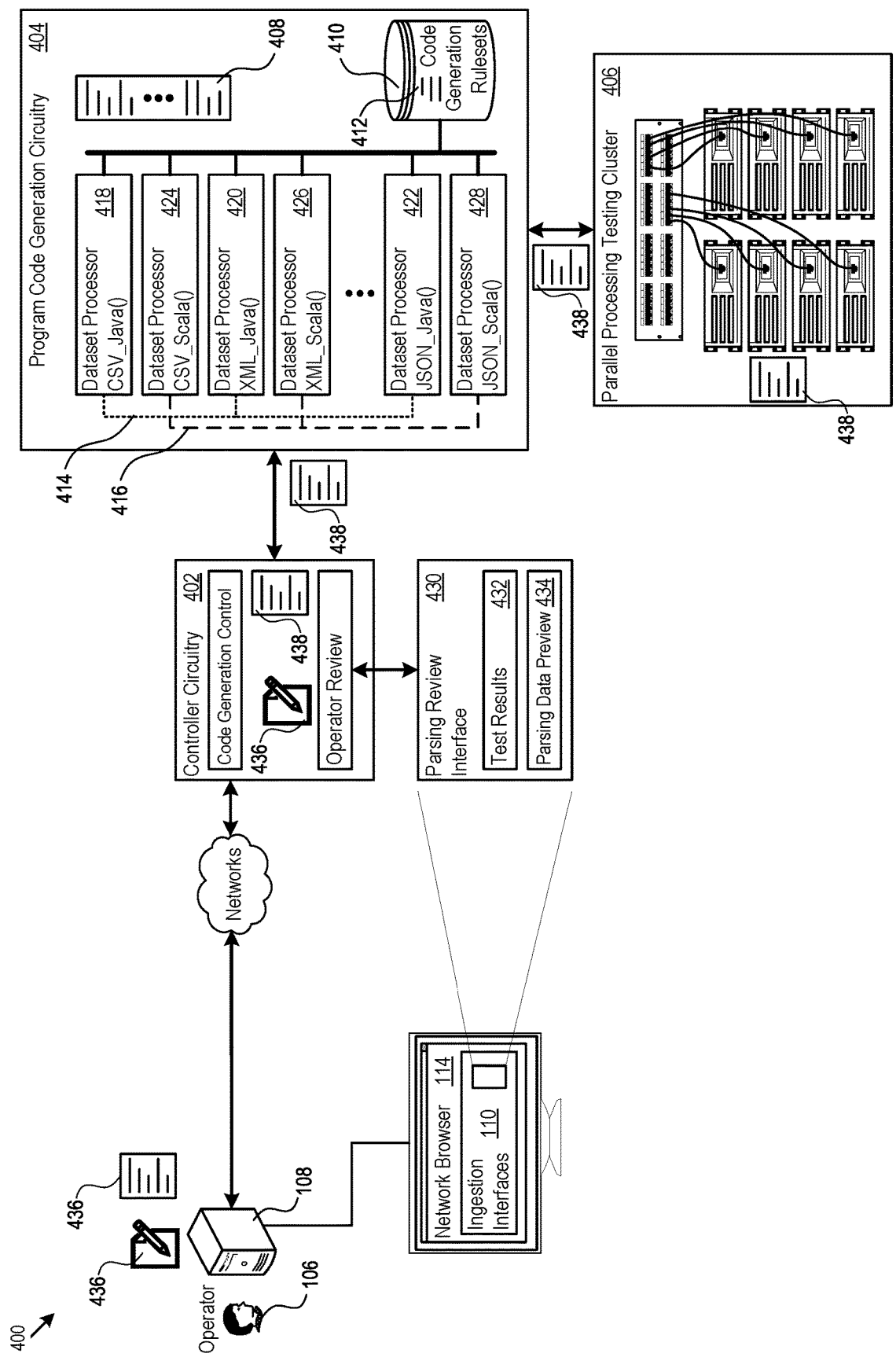
FIG. 4 illustrates another example system implementation for the data ingestion control system.

FIG. 4 illustrates another example system implementation 400 for the data ingestion control system 102. In FIG. 4, the system implementation 400 includes controller circuitry 402, program code generation circuitry 404, and a parallel processing testing cluster 406. As noted above, the controller circuitry 402 guides the operation of the data ingestion control system 102. To that end, the controller circuitry 402 generates and delivers the ingestion interfaces 110 to the operator 106. The ingestion interfaces 110 may include data file format selectors, format-specific parameterization interfaces, and output language selectors. The controller circuitry 402 identifies paired dataset processors in the program code generation circuitry 404 and initiates execution of the paired dataset processor.

In the example of FIG. 4, the program code generation circuitry 404 accepts a sample input file 408, e.g., provided by the controller circuitry 402 in response to operator identification of a sample file. Code generation rulesets 410 may provide code generation rules 412 to the program code generation circuitry 404. More particularly, the program code generation circuitry 404 accepts parameterization inputs from the controller circuitry 402 and responds to directives to execute a particular paired dataset processor. The controller circuitry 402 provides a sample data file with its parameterization inputs to the program code generation circuitry 404. The sample data file and the parameterization inputs may be stored as different files in the architecture that are available to the program code generation circuitry 404. As described in more detail below, a specific file format processor will operator to generate the program code, e.g., responsive to the file type and language selection inputs. The program code generation circuitry 404 reads the sample data file and the parameterization inputs and identifies within the sample data file the different data fields by name, type, length, and other characteristics, and also reads the parameterization inputs to identify file characteristics such as character set, presence or absence of a header, and how to treat NULL values. With this information known, the matching file format processor 418-428 discussed below will call the relevant Spark library for that type of file in the specified language (e.g., Java or Scala) to generate a data frame in Spark which is deployable in the parallel processing cluster. As described further below, the generated code may be deployed in the parallel processing testing cluster 406 for testing purposes. If the tests pass, the controller circuitry 402 may return the results to the operator in tabular format for confirmation purposes prior to downloading to the operator.

In one implementation, the program code generation circuitry 404 includes one or more cluster language generator arrays of multiple file format processors. In the example in FIG. 4, there is a Java cluster language generator array 414 and a Scala cluster language generator array 416. Each cluster language generator array includes file format processors for that particular cluster language. The file format processors may include scripts, executable applications, or other logic that outputs language specific instructions to recognize fields in the dataset and read and save the data elements from the fields. The Java cluster language generator array 414 includes a CSV file format processor 418, an XML file format processor 420, and a JSON file format processor 422. The Scala cluster language generator array 416 includes a CSV file format processor 424, an XML file format processor 426, and a JSON file format processor 428. Java and Scala are example first and second parallel processing cluster programming languages, and the data ingestion control system 102 may generate ingestion code in any other pre-selected programming language.

The program code generation circuitry 404 may execute ingestion tests in the parallel processing testing cluster 406. In that respect, the program code generation circuitry 404 may instantiate and execute the parallel processing cluster ingestion code it has generated in the parallel processing testing cluster 406, e.g., with input from the sample input file 408. The program code generation circuitry 404 may report the test results to the operator 106, e.g., via the review interface 430.

The controller circuitry 402 generates and delivers the review interface 430 to the operator 106. The review interface 430 may include the test results 432 of executing the generated parallel processing cluster ingestion code in the parallel processing test cluster 406. In addition, the review interface 430 may deliver a parsing data preview 434 to the operator 106. The parsing data preview 434 may include a tabular structure view that illustrates how the data in the dataset is parsed for ingestion. The tabular structure may include, e.g., a table of data columns that show the data fields parsed out of the dataset.

The operator 106 may provide feedback via the review interface 430 to the data ingestion control system 102 to correct errors in the parsing. The parsing data preview 434 provides post-ingestion view of the dataset assuming the program code generation circuitry 404 executes given the current selected file format, the parameterization inputs, and the input (e.g., sample) dataset file. After generating the review interface 430, the controller circuitry 402 may await a confirmation input to proceed.

In response to the confirmation input, the controller circuitry 402 initiates execution of the file format processor paired to the selected file format and parameterization inputs, e.g., the JSON file format processor 428 for output language Scala. Furthermore, after generation of the parallel processing cluster ingestion code, the controller circuitry 402 may generate a deployment instruction file 436 for the parallel processing cluster ingestion code, and deliver the deployment instruction file 436 and the parallel processing cluster ingestion code 438 to the operator 106. The deployment instruction file 436 may include, as examples, directions to the operator 106 for how to setup and execute the ingestion code in the parallel processing cluster 104. Examples of directions include IP addresses of the parallel processing cluster, login instructions, file transfer protocol details, cluster commands to execute code, and the like.

Figure 5:
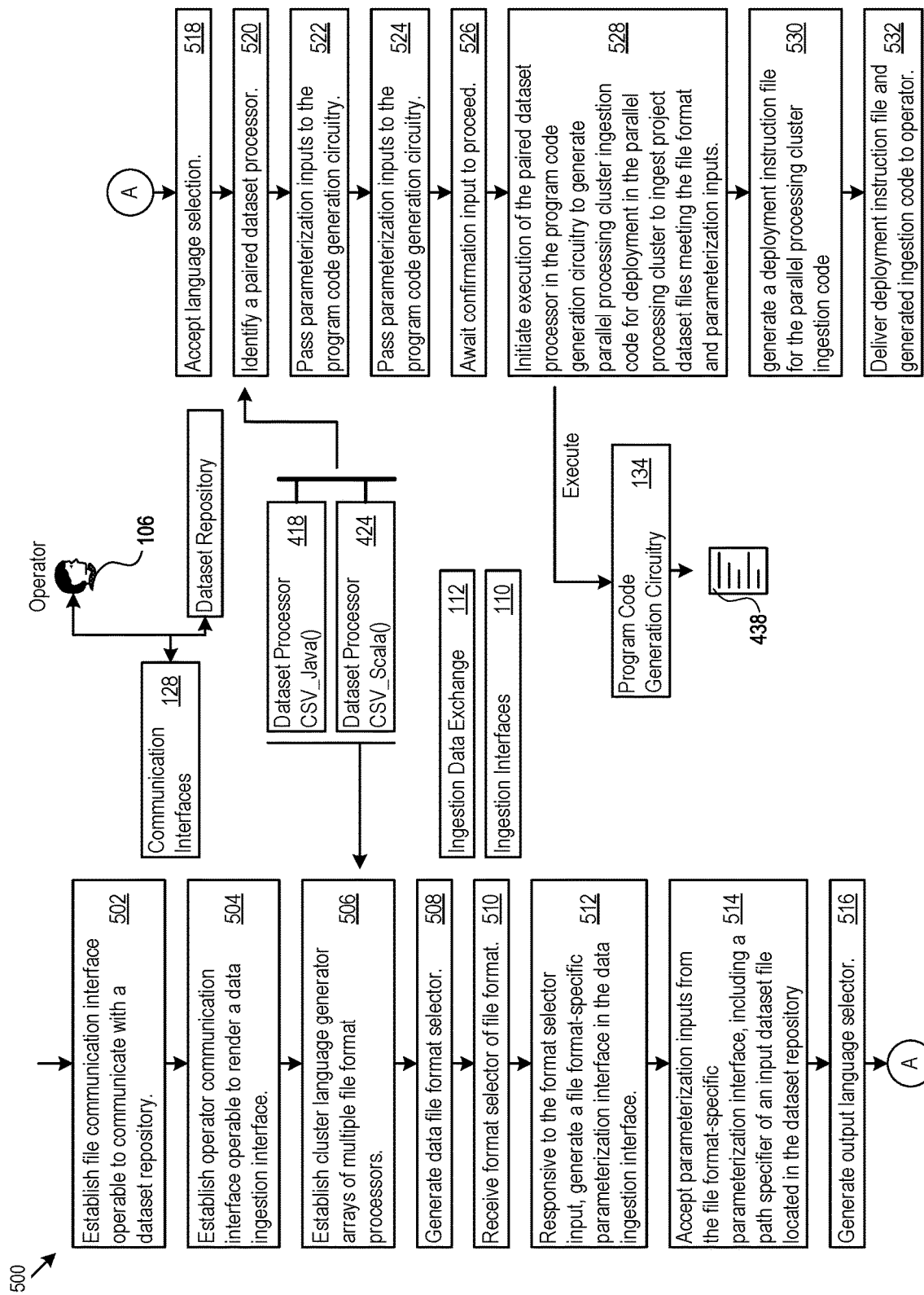
FIG. 5 shows logic that the data ingestion control system may implement to generate parallel processing cluster ingestion code for deployment in a parallel processing cluster to ingest project dataset files.

The functionality of the systems shown in FIGS. 1-4 are discussed in connection with FIG. 5. FIG. 5 shows ingestion logic 500 that the data ingestion control system 102 may implement, e.g., in the controller circuitry 132 and 402 and program code generation circuitry 134 and 404 or in the controller logic 328 and program code generation logic 330. The ingestion logic 500 facilitates and controls the generation of parallel processing cluster ingestion code for deployment in a parallel processing cluster to ingest project dataset files.

The data ingestion control system 102 establishes a file communication interface operable to communicate with a dataset repository (502) and establishes an operator communication interface operable to render an ingestion interface 110 for the operator 106 (504). The data ingestion control system 102 includes program code generation circuitry that establishes a first cluster language generator array of multiple file format processors for a first cluster language, and a second cluster language generator array of multiple file format processors for a second cluster language (506).

The data ingestion control system 102 also includes controller circuitry configured to generate a data file format selector in the data ingestion interface (508) and receive a format selector input specifying a file format from the data file format selector (510). Responsive to the format selector input, the ingestion logic 500 generates a file format-specific parametrization interface in the data ingestion interface for the file format (512). The ingestion logic 500 also accepts parameterization inputs from the file format-specific parameterization interface for the file format, including a path specifier of an input dataset file located in the dataset repository (514).

In addition, the ingestion logic 500 generates an output language selector in the data ingestion interface (516). The output language selector includes GUI elements that are configured to allow the operator 106 to select between the first cluster language and the second cluster language. The ingestion logic 500 accepts a language selection between the first cluster language and the second cluster language from the output language selector.

Responsive to the file format and the language selection, the ingestion logic 500 identifies a paired dataset processor (520). The paired dataset processor is chosen from among the first cluster language generator array and the second cluster language generator array that matches to the language selection and the file format. The ingestion logic 500 also passes the parameterization inputs to the program code generation circuitry (522). The parameterization inputs may include the path specifier of a sample dataset file, among other parameters.

The ingestion logic 500 optionally generates a parsing review interface comprising a post-ingestion data preview responsive to the file format, the parameterization inputs, and the input dataset file (524). The ingestion logic 500 may then await a confirmation input to proceed from the operator 106 (526). In response to the confirmation input, the ingestion logic 500 also initiates execution (e.g., be sending an execution command) of the paired dataset processor in the program code generation circuitry to generate parallel processing cluster ingestion code for deployment in the parallel processing cluster to ingest project dataset files meeting the file format and parameterization inputs (528). After generation of the parallel processing cluster ingestion code, the ingestion logic 500 may generate a deployment instruction file for the parallel processing cluster ingestion code (530) and deliver the deployment instruction file and the parallel processing cluster ingestion code the system operator 106 over the operator communication channel (532).

Figure 6:
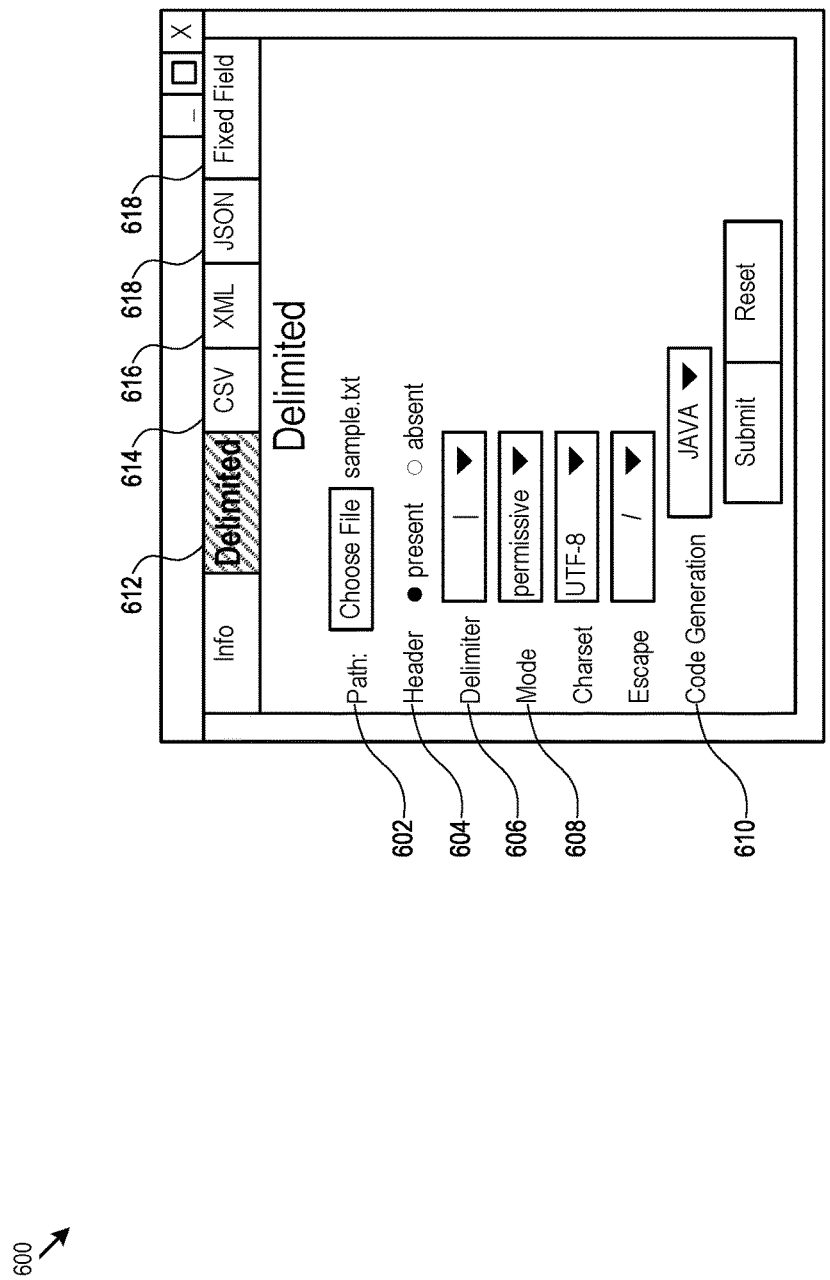
FIGS. 6-10 illustrate example data ingestion interfaces including, as examples: format-specific parameterization interfaces, data file format selectors, output language selectors, parsing review interfaces.

FIG. 6 shows an example format-specific parameterization interface 600 of GUI elements for dataset files with specific delimiters. The path element 602 accepts a path specifier of the dataset file, and may accept globbing expressions. The header element 604 specifies, when set to true, that the first line of the dataset file will be used to name columns and will not be included in data. The default value may be set to false. The delimiter element 606 specifies what dividing character exists between columns (e.g., a comma or vertical bar), and may be set to any character. Other GUI elements may be provided to designate the quote character, the character set used in the dataset, the escape character, and to designate a parser library for the file type (e.g., to selected between "commons" and "univocity" for CSV parsing).

The mode element 608 determines the parsing mode. By default it is PERMISSIVE. Possible values may include: PERMISSIVE: try to parse all lines and insert nulls for missing tokens, extra tokens are ignored; DROPMALFORMED: drop lines which have fewer or more tokens than expected or tokens which do not match the schema; FAILFAST: abort with an error if the system 102 encounters any malformed line. The interface 600 also includes the code generation element 610 which is configured to provide a selection between cluster programming languages to be used for the generated ingestion code, e.g., Java or Scala.

Other GUI elements may include an inference element that allows selection of whether or not to infer the schema in the dataset. If this is chosen, the system 102 automatically infers column types by performing a first pass over the dataset. A comment element may specify whether to skip lines beginning with a specified character (e.g., "#"). A null value element may specify a string that represents a null value, and the system 102 may set instances of this string to nulls in the output. In addition, a date format element may specify a string that indicates the date format to use when reading dates or timestamps. Custom date formats may follow the formats at java.text.SimpleDateFormat. This applies to both DateType and TimestampType. By default, the date format element may be null, and the system 102 will try to parse times and dates using the java.sql.Timestamp.valueOf( ) and java.sql.Date.valueOf( ) library functions.

FIG. 6 also shows data file format selectors: the format selector 612 to choose delimited files, the format selector 614 to choose CSV files, and format selector 616 to choose XML files, the format selector 618 to choose JSON files, and the format selector 620 to choose fixed field files. Responsive to the format selector input, the system 102 generates a format-specific parametrization interface, e.g., the interface 600 for delimited files. The GUI elements 602-612, and the other elements noted above, accept parameterization inputs from the format-specific parameterization interface for the file format. These inputs include, e.g., a path specifier of an input dataset file located in the dataset repository, an output code language selection (e.g., Java or Scala), delimiters, escape characters, and other inputs.

Figure 7:
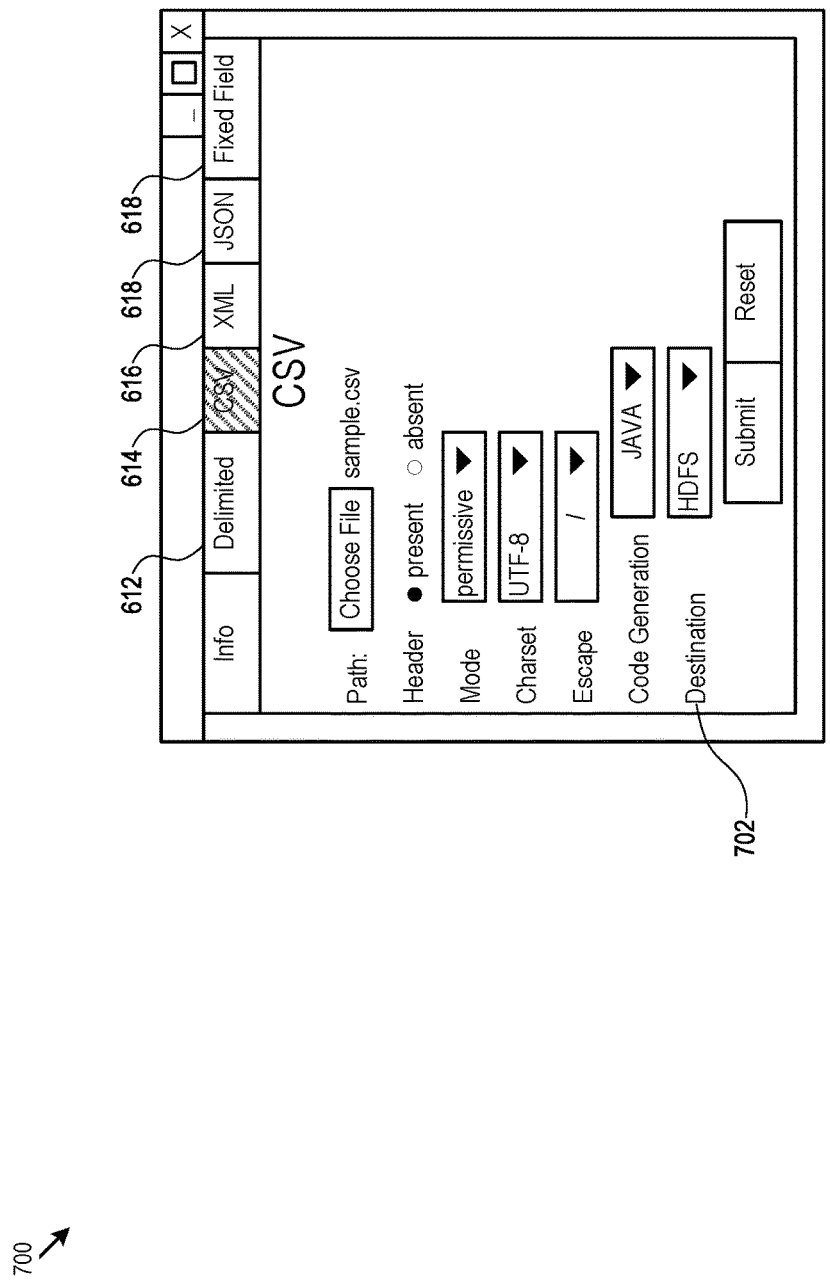

FIG. 7 shows an example format-specific parameterization interface 700 for CSV dataset files, i.e., the delimiter is a comma. The interface 700 shares many of the GUI elements as FIG. 6, and also shows an example of a destination element 702 which specifies the delivery point for the generated ingestion code. Note that the interface 600 may be chosen when delimiters other than commas are used in the dataset.

Figure 8:
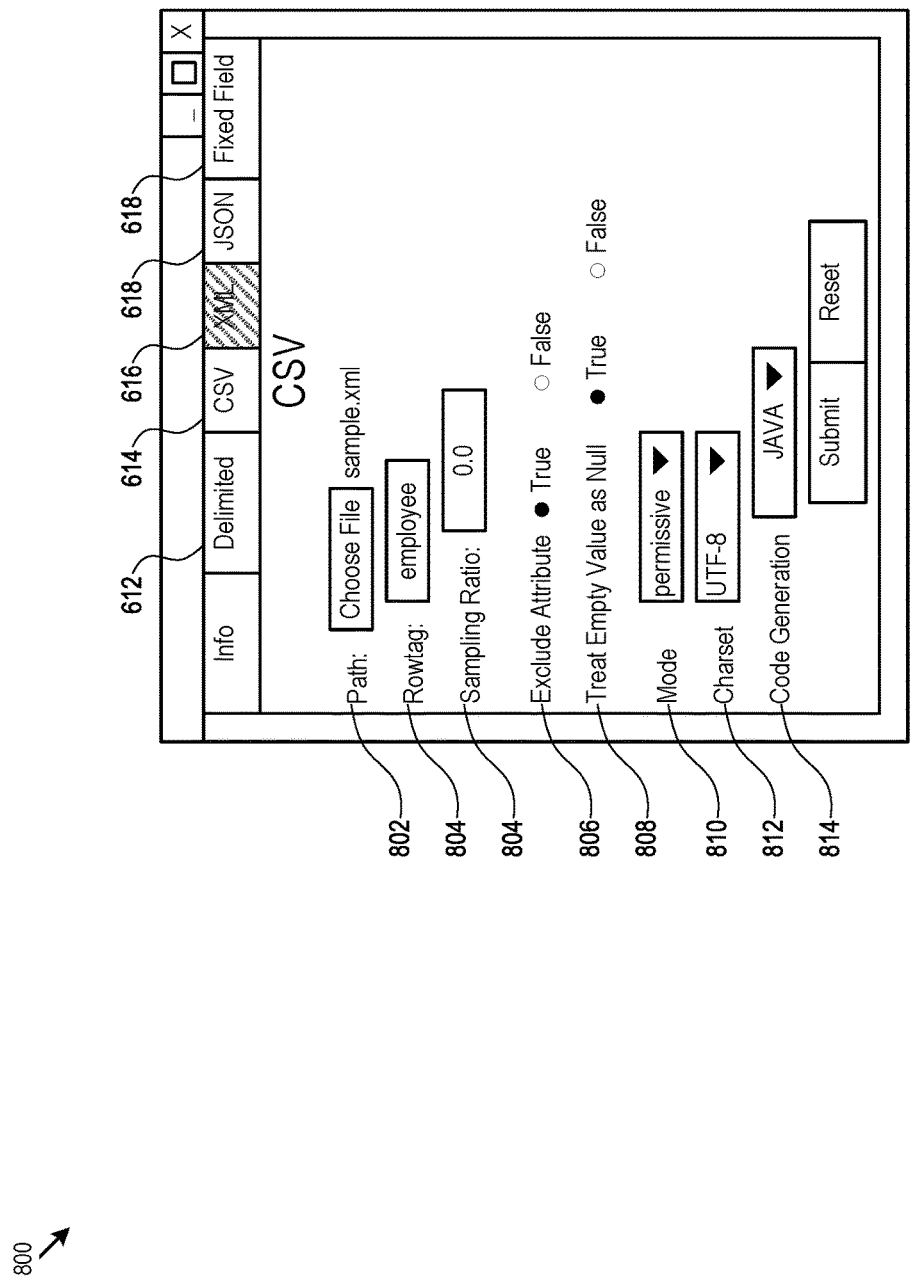

FIG. 8 shows an example format-specific parameterization interface 800 for XML dataset files. The path element 802 specifies a path specifier of an input dataset. The rowTag element 804 specifies the row tag of an XML file to treat as a row. For instance, in the XML string <books><book><book>. . . </books>, the appropriate value would be book. Default is ROW. The system 102 detect and respond to self-closing XML tags.

The sampling ratio element 804 specifies a sampling ratio for inferring the schema in the XML file. The sampling ratio element 804 may, for instance, accept values from 0.0 to 1.0, with a default of 1.0. Possible types are StructType, ArrayType, StringType, LongType, DoubleType, BooleanType, TimestampType and NullType.

The sampling ratio is used to infer the schema from a given XML file. The sampling ratio may, for instances, take a value between 0.0 to 1.0, with 0.0 representing 0% and 1.0 representing 100%. That is, the sampling ratio specifies what percentage of a given XML file to check to infer the schema of the XML. As a specific example, if the sampling ratio is 0.3, then the system will evaluate 30% of the sample XML file to infer the schema. For large XML files that are well formed, the sampling ratio may be set lower and still obtain accurate results.

In other implementations, the sampling ratio is not used and instead the interface 800 provides a schema definition input section through which the operator may directly provide a synthetic schema to the system that represents the schema, e.g., as a StructType object. The StructType effectively builds the schema using specified types such as StringType and LongType as different datatypes for different fields in the XML file.

One specific example is:

```
StructType(Array(
    StructField("_id", StringType, nullable = true),
    StructField("author", StringType, nullable = true),
    StructField("description", StringType, nullable = true),
    StructField("genre", StringType ,nullable = true),
```

```
  StructField("price", DoubleType, nullable = true),
  StructField("publish_date", StringType, nullable = true),
  StructField("title", StringType, nullable = true)))
```

The exclude attribute 806 specifies whether to exclude attributes in elements or not, and the default is false. The null element 808 specifies whether to treat whitespaces as null values, and the default is false. The interface 800 also includes a mode element 810, a character set element 812, and a code generation element 814 with the functionality described above with respect to FIG. 6.

Other GUI elements that may be included are the corrupt record element that specifies the name of a new field where malformed strings are formed, with a default of _corrupt_record; an attribute prefix field that specifies a prefix for field names to differentiate attributes from elements, with a default of underscore ''; and a value tag field that specifies the value when there are attributes in the element having no child, with a default value of _VALUE.

Figure 9:
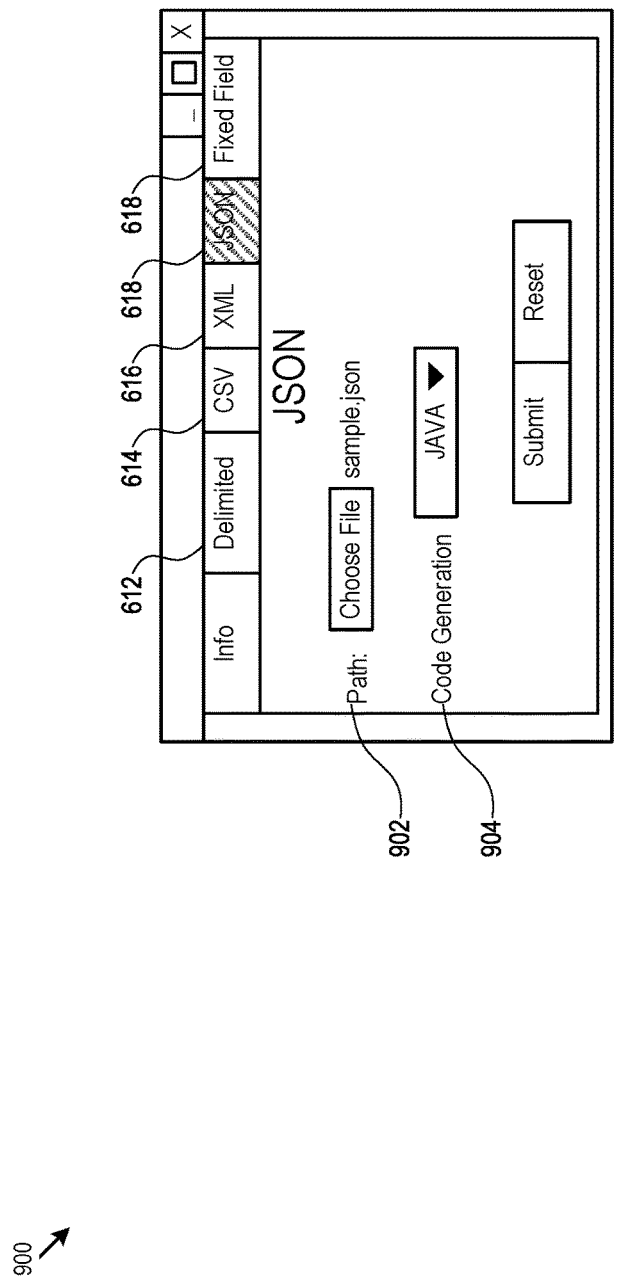

FIG. 9 shows an example format-specific parameterization interface 900 for JSON dataset files. The interface 900 includes a path element 902 and a code generation element 904 with the functionality described above with respect to FIG. 6. For JSON files, the system 102 will convert the JSON into a tabular format for ingestion into Hive or HDFS, as examples. The following code segment in Table 1 is one example of code that may be used to analyze the JSON using SQL.

TABLE 1

```
// Create SQLContext
val sqlContext = new org.apache.spark.sql.SQLContext(sc)
// Input JSON File as follows
// {"name":"ABC", "address":{"city":"PQR","state":"XYZ"}}
// {"name":"ABC2", "address":{"city":PQR2, "state":"XYZ2"}}
// Create a SchemaRDD for the JSON dataset.
val address = sqlContext.jsonFile("[the path to the JSON file]")
// Register the created SchemaRDD as a temporary table.
people.registerTempTable("address")
```

When Hive is selected as an output destination, then the system 102 may provide a datamodel definition interface to the operator 106. The datamodel definition interface allows the operator 106 to define a Hive datamodel. The datamodel definition interface also allows the operator 106 to specify the Hive table name that will receive the ingested data.

Figure 10:
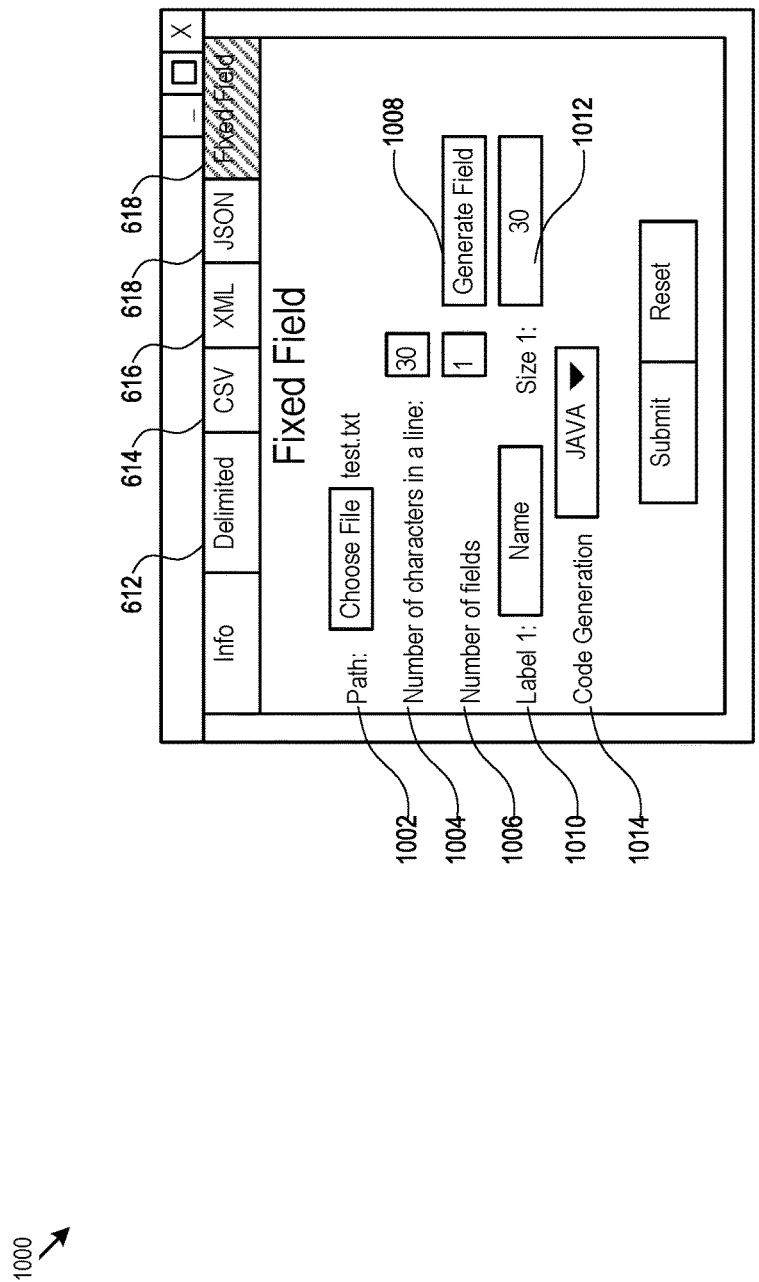

FIG. 10 shows an example format-specific parameterization interface 1000 for fixed fields dataset files. The interface 1000 includes a path element 1002 and a code generation element 1014 with the functionality described above with respect to FIG. 6. The interface 1000 allows the operator 106 to specify the number of characters in a line using the line element 1004, and the number of fields using the field number element 1006. The field generation element 1008 will cause the system 102 to create the number of fields specified in the field number element 1006. Each field may have a name given the label element 1010 of the size given by the size element 1012. The interface 1000 may be used for fixed length fields in which every record has a fixed number of characters and out of which every field has a fixed length as well. The label element 1010 takes input from the operator of the field name, and the size element 1012 takes input from the operator of the size of the field. The division of each record in the data field among different fields occurs accordingly. For instance, assume the total length of a record is 24 characters and that there are five fields in each record. In this example, the interface 1000 generates five label and size elements in which the label and the size for each field may be entered, with validation that the total size of the five fields adds to the 24 character total record size.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. In other implementations, any of the databases may be part of a single database structure, and, more generally, may be implemented logically or physically in many different ways. Each of the databases defines tables storing records that the control instructions read, write, delete, and modify to perform the processing noted below. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

The individual features described above may be used in any combination. For instance, any of the ingestion interfaces may include or exclude any of the GUI elements illustrated in FIGS. 6-10. The controller circuitry may implement additional or fewer features, as may the program code generation circuitry. In other implementations, sample dataset files may not be used, and instead the program code generation circuitry may analyze a full dataset file.

The data ingestion control system 102 provides many technical advantages in solving the technical problem of ingesting large complex datasets. One technical aspect of the ingestion control system is an efficient and lucid interface via the ingestion interfaces 110. The data ingestion control system 102 generates re-usable code with multiple language support, e.g., Java and Scala, with deployment to parallel processing clusters such as Hadoop™ clusters. The code is tested before delivery to the operator 106. At the same time, the system 102 provides multiple data format support. As examples the system 102 may support CSV, delimited, fixed width, XML, JSON or other file formats.

Note also that the data ingestion control system 102 does not require a local application installation, e.g., on the local system 108. Instead, the system 102 may be deployed as a web based application running on top of a cloud based four-node Hadoop™ cluster. Furthermore, the ingestion code generation circuitry supports code generation for multiple platforms, including Hadoop, Hive, Cassandra, MongoDB or other NO SQL platforms. In other implementations, the system 102 implements a web-based schema creation interface in which the operator 106 may create a structured schema for data ingestion to a persistence table (e.g. in Apache Hive). The operator 106 need not write any code; instead the schema creation interface allows the operator 106 to directly create the schema, with ingestion into the same data layer.

Various implementations have been specifically described. However, many other implementations are also possible.

What is claimed is:

1. A system comprising:
    in a data ingestion control system for a parallel processing cluster:
        a file communication interface operable to communicate with a dataset repository;
        an operator communication interface operable to render a data ingestion interface; and
        system circuitry in communication with the file communication interface and the operator communication interface, the system circuitry configured to:
            generate a data file format selector in the data ingestion interface;
            receive a format selector input representing a file format from the data file format selector;
            responsive to the format selector input, generate a format-specific parametrization interface in the data ingestion interface for the file format;
            accept parameterization inputs from the format-specific parameterization interface for the file format, including a path specifier of an input dataset file located in the dataset repository;
            responsive to the format selector input, identify format-specific code generation logic, and pass the parameterization inputs and the path specifier to the format-specific code generation logic;
            execute the format-specific code generation logic, the format-specific code generation logic configured to:
                receive the parameterization inputs;
                receive the path specifier;
                sample, responsive to the parameterization inputs, the input dataset file located by the path specifier in the dataset repository; and
                responsive to the sampling, generate parallel processing cluster ingestion code for deployment in a parallel processing cluster to ingest project dataset files meeting the file format and parameterization inputs.

2. The system of claim 1, where:
    the system circuitry is further configured to:
        accept a language specifier of a parallel processing cluster language; and
        generate the parallel processing cluster ingestion code in the parallel processing cluster language.

3. The system of claim 2, where:
    the system circuitry is further configured to:
        generate an output language selector in the data ingestion interface that is configured to accept the language specifier, and where the language selector input comprises a Scala selector, a Java selector, or both.

4. The system of claim 1, where:
    the system circuitry is further configured to:
        execute an ingestion test of the parallel processing cluster ingestion code on a test cluster.

5. The system of claim 4, where:
    system circuitry is further configured to:
        generate a deployment instruction file for the parallel processing cluster ingestion code; and
        deliver the deployment instruction file and the parallel processing cluster ingestion code to a system operator.

6. The system of claim 1, where:
    the operator communication interface is configured to render the data ingestion interface over an exposed network protocol layer.

7. The system of claim 1, where:
    system circuitry is further configured to:
        generate a parsing review interface comprising a post-ingestion data preview responsive to the file format, the parameterization inputs, and the input dataset file;
        await a confirmation input to proceed; and
        in response to the confirmation input, sample the input dataset file and generate the parallel processing cluster ingestion code.

8. The system of claim 1, where:
    the format selector input comprises:
    a 'delimited' selector, a comma separated value (CSV) selector, a 'fixed field' selector, or any combination thereof.

9. The system of claim 1, where:
    the format selector input comprises:
    a extensible markup language (XML) selector, a javascript object notation (JSON) selector, or both.

10. A method comprising:
    in a data ingestion control system for a parallel processing cluster:
        establishing a file communication channel to a dataset repository;
        establishing an operator communication channel for interaction with the data ingestion control system;
        rendering a data ingestion interface over the operator communication channel; and
        with system circuitry in communication with the file communication channel and the operator communication channel:

generating a data file format selector in the data ingestion interface;

receiving a format selector input representing a file format from the data file format selector;

responsive to the format selector input, generate a format-specific parametrization interface in the data ingestion interface for the file format;

accepting parameterization inputs from the format-specific parameterization interface for the file format, including a path specifier of an input dataset file located in the dataset repository;

responsive to the format selector input, identifying format-specific code generation logic;

passing the parameterization inputs and the path specifier to the format-specific code generation logic;

with the format-specific code generation logic:
receiving the parameterization inputs;
receiving the path specifier;
sampling, responsive to the parameterization inputs, the input dataset file located by the path specifier in the dataset repository; and
responsive to the sampling, generating parallel processing cluster ingestion code for deployment in a parallel processing cluster to ingest project dataset files meeting the file format and parameterization inputs.

11. The method of claim 10, further comprising:
accepting a language specifier of a parallel processing cluster language; and
generating the parallel processing cluster ingestion code in the parallel processing cluster language.

12. The method of claim 11, further comprising:
generating an output language selector in the data ingestion interface that is configured to accept the language specifier, and where the language selector input comprises a Scala selector, a Java selector, or both.

13. The method of claim 12, further comprising:
executing an ingestion test of the parallel processing cluster ingestion code on a test cluster.

14. The method of claim 13, further comprising:
generating a deployment instruction file for the parallel processing cluster ingestion code; and
delivering the deployment instruction file and the parallel processing cluster ingestion code to a system operator over the operator communication channel.

15. The method of claim 14, further comprising:
rendering the data ingestion interface over an exposed network protocol layer.

16. The method of claim 15, further comprising:
generating a parsing review interface comprising a post-ingestion data preview responsive to the file format, the parameterization inputs, and the input dataset file;
awaiting a confirmation input to proceed; and
in response to the confirmation input, sampling the input dataset file and generating the parallel processing cluster ingestion code.

17. The method of claim 16, where:
the format selector input comprises:
a 'delimited' selector, a comma separated value (CSV) selector, a 'fixed field' selector, or any combination thereof.

18. The method of claim 17, where:
the format selector input comprises:
a extensible markup language (XML) selector, a javascript object notation (JSON) selector, or both.

19. A system comprising:
in a data ingestion control system for a parallel processing cluster:
a file communication interface operable to communicate with a dataset repository;
an operator communication interface operable to render a data ingestion interface;
system circuitry in communication with the file communication interface and the operator communication interface, the system circuitry comprising:
program code generation circuitry comprising:
a first cluster language generator array of multiple file format processors for a first cluster language;
a second cluster language generator array of multiple file format processors for a second cluster language; and
controller circuitry configured to:
generate a data file format selector in the data ingestion interface;
receive a format selector input specifying a file format from the data file format selector;
responsive to the format selector input, generate a file format-specific parametrization interface in the data ingestion interface for the file format;
accept parameterization inputs from the file format-specific parameterization interface for the file format, including a path specifier of an input dataset file located in the dataset repository;
generate an output language selector in the data ingestion interface, the output language selector operable to distinguish between the first cluster language and the second cluster language;
accept a language selection between the first cluster language and the second cluster language from the output language selector; and
responsive to the file format and the language selection, identify a paired dataset processor among the first cluster language generator array and the second cluster language generator array that matches to the language selection and the file format;
pass the parameterization inputs to the program code generation circuitry; and
initiate execution of the paired dataset processor in the program code generation circuitry to generate parallel processing cluster ingestion code for deployment in the parallel processing cluster to ingest project dataset files meeting the file format and parameterization inputs.

20. The system of claim 19, where:
the controller circuitry is further configured to:
generate a parsing review interface comprising a post-ingestion data preview responsive to the file format, the parameterization inputs, and the input dataset file;
await a confirmation input to proceed;
in response to the confirmation input, initiate execution of the paired file format generator; and
after generation of the parallel processing cluster ingestion code:
generate a deployment instruction file for the parallel processing cluster ingestion code;
deliver the deployment instruction file and the parallel processing cluster ingestion code to a system operator over the operator communication channel.

* * * * *